US008116226B1

(12) United States Patent
Liao et al.

(10) Patent No.: US 8,116,226 B1
(45) Date of Patent: Feb. 14, 2012

(54) METHOD AND APPARATUS FOR BROADCAST PRIMITIVE FILTERING IN SAS

(75) Inventors: Heng Liao, Belcarra (CA); Larrie Simon Carr, Nelson (CA)

(73) Assignee: PMC-Sierra, USA Inc., Sunnyvale, CA (US)

( * ) Notice: Subject to any disclaimer, the term of this patent is extended or adjusted under 35 U.S.C. 154(b) by 1067 days.

(21) Appl. No.: 11/341,574

(22) Filed: Jan. 30, 2006

Related U.S. Application Data

(60) Provisional application No. 60/647,401, filed on Jan. 28, 2005.

(51) Int. Cl.
*H04L 12/28* (2006.01)
*G06F 3/00* (2006.01)
*G06F 13/00* (2006.01)
*G06F 15/16* (2006.01)
*G06F 15/173* (2006.01)

(52) U.S. Cl. ............... 370/254; 370/395.31; 370/401; 370/409; 709/220; 709/225; 709/229; 709/238; 709/250; 710/2; 710/36; 710/316

(58) Field of Classification Search ............. 370/254, 370/395.31, 401, 409; 709/220, 225, 229, 709/238, 250; 710/2, 36, 316
See application file for complete search history.

(56) References Cited

U.S. PATENT DOCUMENTS

| | | | |
|---|---|---|---|
| 6,622,163 B1 * | 9/2003 | Tawill et al. ............... 709/211 |
| 6,765,919 B1 * | 7/2004 | Banks et al. ............... 370/401 |
| 7,028,106 B2 * | 4/2006 | Foster et al. ............... 710/2 |
| 7,035,952 B2 * | 4/2006 | Elliott et al. ............... 710/300 |
| 7,124,234 B2 * | 10/2006 | Marushak et al. ............ 710/316 |
| 7,155,546 B2 * | 12/2006 | Seto ............... 710/100 |
| 7,210,065 B2 * | 4/2007 | Uddenberg et al. ............ 714/33 |
| 7,334,075 B2 * | 2/2008 | Marushak et al. ............ 710/316 |
| 7,353,302 B2 * | 4/2008 | Seto ............... 710/36 |
| 7,373,443 B2 * | 5/2008 | Seto ............... 710/100 |
| 7,376,147 B2 * | 5/2008 | Seto et al. ............... 370/465 |
| 7,401,171 B2 * | 7/2008 | Slutz et al. ............... 710/104 |
| 7,412,631 B2 * | 8/2008 | Uddenberg et al. .......... 714/47.1 |
| 7,466,712 B2 * | 12/2008 | Makishima et al. .......... 370/401 |
| 7,496,700 B1 * | 2/2009 | Chong et al. ............... 710/52 |
| 7,506,078 B2 * | 3/2009 | Wootten et al. ............... 710/15 |
| 7,644,168 B2 * | 1/2010 | Grieff et al. ............... 709/229 |
| 7,738,397 B2 * | 6/2010 | Clayton ............... 370/254 |
| 2004/0205256 A1 * | 10/2004 | Hoffman et al. ............... 710/1 |
| 2005/0080881 A1 * | 4/2005 | Voorhees et al. ............ 709/220 |
| 2005/0138221 A1 * | 6/2005 | Marushak ............... 710/1 |

(Continued)

OTHER PUBLICATIONS

Evans, Mark, "Serial Attached SCSI Architecture: Part 2—The SAS Link Layer", Maxtor, White paper, Dec. 2003, 6 pages.*

*Primary Examiner* — Alpus H Hsu
(74) *Attorney, Agent, or Firm* — Alexander Anishchenko; Borden Ladner Gervais LLP (57) ABSTRACT

Broadcast primitive filtering in a SAS expander using virtual domains. The virtual domains can be non-overlapping or overlapping logical subsets of the physical topology, or a logical construct based on the membership of a device within a group. Broadcast event propagation is handled in accordance with predetermined policies associated with the virtual domains. These policies can, for example, include limiting the broadcast traffic within the boundaries of the logical zones defined by the subsets, or routing the broadcast events in accordance with access policies, or privileges, associated with the group.

32 Claims, 9 Drawing Sheets

U.S. PATENT DOCUMENTS

2005/0154826 A1* 7/2005 Marks et al. .................. 711/114
2005/0204197 A1* 9/2005 Uddenberg et al. ............. 714/33
2005/0281196 A1* 12/2005 Tornetta et al. ............... 370/235
2006/0004935 A1* 1/2006 Seto et al. ....................... 710/62
2006/0039405 A1* 2/2006 Day et al. ...................... 370/469
2006/0101171 A1* 5/2006 Grieff et al. .................... 710/36

* cited by examiner

METHOD AND APPARATUS FOR BROADCAST PRIMITIVE FILTERING IN SAS

CROSS REFERENCE TO RELATED APPLICATIONS

This application claims the benefit of U.S. Provisional Patent Application No. 60/647,401 filed on Jan. 28, 2005, which is incorporated herein by reference in its entirety.

FIELD OF THE INVENTION

The present invention relates generally to protocols relating to the physical interconnection of storage devices. More particularly, the present invention relates to the Serial Attached SCSI (SAS) protocol and broadcast filtering.

BACKGROUND OF THE INVENTION

Serial Attached SCSI (Small Computer System Interface), or SAS, is a connection-oriented protocol that allows storage devices, such as servers and disk drives, to communicate through a network of high-speed serial physical interconnects. The SAS standard was developed by the ANSI INCITS10 group.

The SAS standard defines three transport level protocols, which are used in a SAS topology under different circumstances: Serial SCSI Protocol (SSP) to transport SCSI commands, Serial Management Protocol (SMP) to transport management commands, and Serial Advanced Technology Attachment Tunnelling Protocol (STP) to transport serial Advanced Technology Attachment (ATA) commands between storage devices. The protocol is intended to be used in conjunction with SCSI and ATA command sets.

Connections between a host device and a target drive are managed by intermediate devices called expanders. SAS expanders are part of the service delivery subsystem, and act as connection management agents, or a switch fabric, having physical connections to multiple host devices or disk drives simultaneously. Devices connect to an expander across physical links attached to ports on the device and the expander. In SAS, a physical link is typically a set of four signal lines used as two differential pairs. A phy is a transceiver that electrically interfaces with a physical link, combined with the portions of the protocol that encode data and manage the reset sequences. A port is created when one or more phys share the same address and attach to a device through one or more physical links.

Multiple SAS end devices and SAS expander devices can be connected together to form a SAS domain topology. According to the SAS standard, expanders can only have ports in one domain. There can be one or multiple physical links connecting each pair of neighbouring devices. When there is a single physical link between two devices, the associated phy on the SAS device is called a narrow port. When there are multiple physical links connecting two devices, the associated phys on an expander are considered to be a wide port. In other words, all links of a wide port are considered to form a common logical link from a routing perspective, although they allow multiple simultaneous connections to pass through the wide port at the same time. The SAS protocol provides unlimited access to all resources attached to the domain, since it is designed for a trusted environment where traffic isolation and access control in a SAS domain is not needed. However, there are many application environments where traffic isolation and/or controlled access may be desirable to protect against unauthorized access or interference between unintended devices in a physical domain.

The SAS protocol uses broadcast primitives to communicate asynchronous events amongst SAS devices. The standard defines eight types of broadcast primitives, or special control Dwords, that are transmitted into the physical link to communicate up to eight types of asynchronous events, such as topology changes. The broadcast primitives are handled by a SMP target port contained within the expander. Expanders provide unrestricted access to the SMP target, giving unrestricted control of the expander to any other device within the domain. A primitive is fundamentally different from a packet. A packet is typically a multi-byte data structure containing some type of code for delineation of start of packet and end of packet, a header containing address information, data payload and checksum. Except for an identification of the type of event, the broadcast primitive does not carry any additional information such as source address, destination address, or time to live.

When a SAS expander receives a broadcast primitive, the primitive is propagated to all the phys of the expander except for the source phy, and other phys on the same port at which the original broadcast primitive was received. When an end device receives a broadcast primitive, it notifies the upper layer of the occurrence of the asynchronous event as indicated by the primitive type, but does not further propagate the primitive. Thus, when a broadcast primitive is injected into a SAS topology, the primitive propagates to all devices connected by the topology, including all end devices and expander devices.

A valid SAS topology cannot contain a loop, i.e. there can be only one logical path, considering all links of a wide port to be a single link, to traverse the topology from any device to any other device. Furthermore, within a SAS physical domain, there is no mechanism to limit the exchange of information to isolate any device from any other device.

Limiting SAS topology in each domain to be loop-free (i.e. a spanning tree) is of importance from a primitive broadcast perspective. In a topology with a loop, the primitive broadcast mechanism in the expanders will cause infinite circulation of broadcast primitives along the loop path. When a broadcast primitive reaches an expander in the loop path, it will multiply itself to other links on that expander as well. The end result is the link bandwidth on the entire topology can be consumed by infinite repetition of the broadcast primitive, making the topology unusable for transporting data or control traffic. Thus, a loop in a SAS domain topology can cause and infinite broadcast storm.

The spanning tree bridging protocol provides a Layer 2 bridging control protocol that discovers physical loops that may exist in a physical topology and selectively disables some switch ports to reduce the logical topology to provide a spanning tree topology that does not contain loops. However, in so doing, these switch ports are also disabled for transporting useful data traffic.

It is, therefore, desirable to provide a broadcast method and system that can be implemented in SAS domains that contain loops, preferably without disabling ports. It is also desirable to provide a broadcast filtering method and system that permits isolation, or segregation, of certain devices within the domain.

SUMMARY OF THE INVENTION

In a first aspect, the present invention provides a method for broadcast event filtering. The method comprises defining virtual domains within a serial attached small computer system interface (SAS) domain topology; receiving a broadcast event from a physical layer device associated to one of the virtual domains; and transmitting the broadcast event according to a policy associated with the virtual domain. The physical layer device is typically a phy.

In one embodiment, the virtual domains can comprise a plurality of logical zones within the SAS domain topology, wherein each phy in the SAS topology is associated to at least one of the logical zones. Transmitting the broadcast event can include transmitting the broadcast event to phys associated with a single logical zone, or multiple zones to which a phy is associated. Receiving the broadcast event can include receiving zone membership information from the at least one phy. Receiving the broadcast event can also includes receiving a broadcast primitive, such as receiving a broadcast primitive processor (BPP) request message. The broadcast event can include transmitting a BPP transmit indication signal.

In a further embodiment, the virtual domains can comprises phys in the SAS topology associated to device groups defined by group identification information. Receiving the broadcast event can include receiving a broadcast frame including a broadcast primitive and the group identification information associated with a source phy, or receiving a broadcast primitive at an ingress expander phy and associating the group identification information associated with a source phy to the broadcast event. Transmitting the broadcast event can include transmitting the associated group identification information. When transmitting the broadcast event from an egress expander phy, the associated group identification information can be removed. The policy associated with the virtual domain can be device group access policy, such as a policy matrix.

In a further aspect, the present invention provides a SAS expander device. The device comprises a plurality of ports, each port having at least one phy; and a broadcast primitive processor (BPP) function for managing broadcast event propagation between the ports according to a policy associated with a virtual domain defined within a SAS topology. The virtual domain can be a logical zone defined within the SAS topology, and the BPP function can be associated with a virtual expander associated with the logical zone. The BPP function can include means to limit broadcast event propagation to the logical zone, and can include a configuration register for storing zone membership information for each phy. The broadcast event can include a broadcast primitive, and the BPP request and indication messages can include zone information associated with a source phy.

In a further embodiment, the virtual domain can be defined based on group membership of phys within the SAS topology, and the BPP function can include means to manage broadcast event propagation in accordance with a device group access policy.

In a further aspect, the present invention provides a SAS topology to permit broadcast primitive filtering. The topology comprises a plurality of host and target devices, each including at least one phy; at least one expander for interconnecting the plurality of host and target devices; a virtual domain defined within the topology; the virtual domain having logically associated therewith a subset of the phys; and a broadcast primitive processor (BPP) function for managing propagation of a broadcast event from any of the host and target devices according to a policy associated with the virtual domain. A plurality of virtual domains can be defined within the topology. The plurality of virtual domains can include a plurality of logical zones comprising separate subsets of phys. These zones can be non-overlapping or overlapping.

The BPP function can restrict propagation of the broadcast event to one of the plurality of logical zones.

Alternately, the virtual domain can be defined in accordance with group membership of the host and target devices. The at least one expander can form a switch fabric having ingress and egress ports. The BPP function can associate group membership information to the broadcast event upon receipt at an ingress port, and removes the group membership information upon transmittal from an egress port.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and apparatus for broadcast primitive filtering in a SAS expander using virtual domains. The SAS topology defined by the ANSI INCITS10 standard only relates to physical topology with multiple end devices and expander devices, and the broadcast handling mechanisms in such physical topologies. The present invention defines virtual domains that can be non-overlapping or overlapping logical subsets of the physical topology, or a logical construct based on the membership of a device within a group. Broadcast event propagation is handled in accordance with predetermined policies associated with the virtual domains. These policies can, for example, include limiting the broadcast traffic within the boundaries of the logical zones defined by the subsets, or routing the broadcast events in accordance with access policies, or privileges, associated with the group A SAS primitive is a four character code sequence, called a control Dword, that starts with an 8b10b encoded control character followed by three 8b10b data characters identifying the type of the primitive. A primitive does not contain header, address or payload information. Most known techniques teach broadcast filtering based on packet header information that does not exist in a SAS primitive, hence they can not be applied or extended to handle SAS primitive broadcast filtering.

Figure 1:
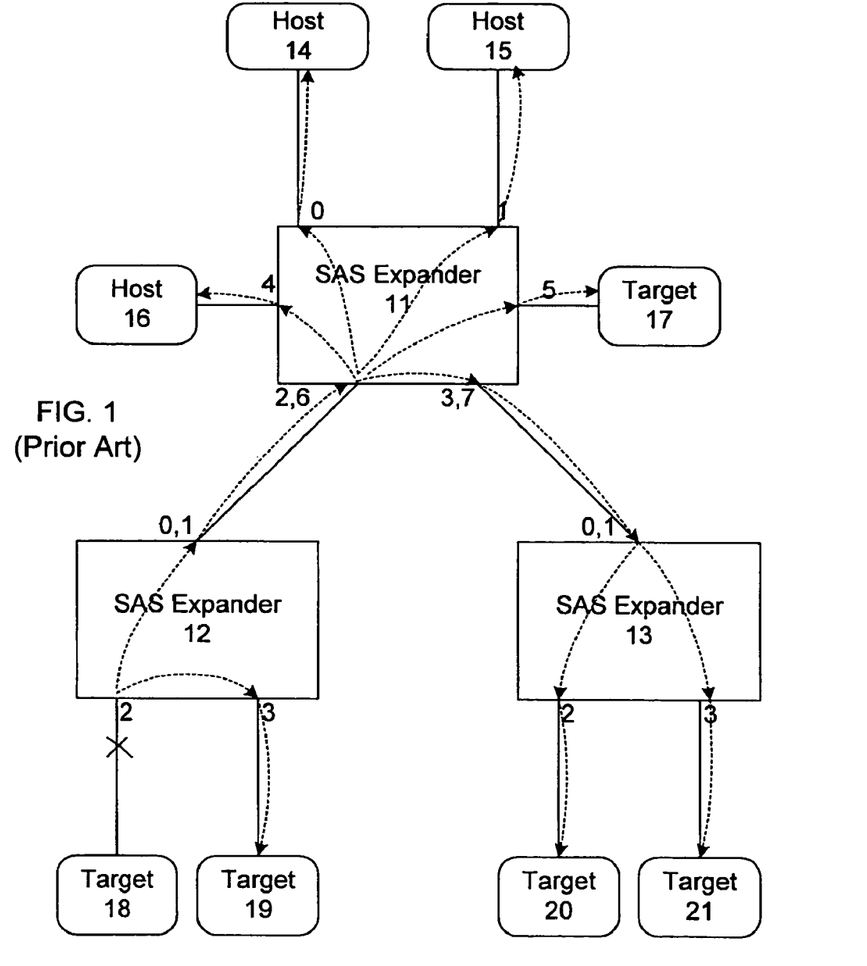
FIG. 1 illustrates known SAS broadcast methods.

A conventional SAS topology is shown in FIG. 1. In this example, the topology contains three expanders 11, 12, 13;

three host devices 14, 15, 16 and five target devices 17, 18, 19, 20, 21. The ports of each expander are labelled at the expander's edge with their respective phys. For example, expander 11 has six ports indicated by the phys labelled 0 to 7. Ports indicated by a single phy are narrow ports, while those identified by two phys are wide ports.

The dotted arrows in FIG. 1 illustrate the conventional propagation of a broadcast event originating from phy 2 of expander 12. For example, the broadcast event could be a loss of synchronization between phy 2 and the target device 18. A broadcast request is received by the broadcast primitive processor (BPP) of expander 12. Expander 12, sends the broadcast primitive to all ports except the source port, including target 19 via phy 3 and expander 11 via the wide port defined by phy 0 and phy 1. Expander 11 receives the broadcast primitive from the wide port defined by phy 2 and phy 6. Expander 11 then propagates the broadcast primitive to all ports except for the source port. The broadcast primitive is transmitted to host 16 via phy 4, host 14 via phy 0, host 15 via phy 1, target 17 via phy 5 and expander 13 via the phy 3 and phy 7 wide port. Expander 13 then receives the broadcast event from phy 0 and phy 1 wide port. It propagates the broadcast to all ports except for the source port. The broadcast primitive is transmitted to target 20 via phy 2 and to target 21 via phy 3. In the end, all devices, including hosts, targets and expanders, within the domain have received at least one broadcast primitive indicating a broadcast event has occurred in the domain.

Figure 2:
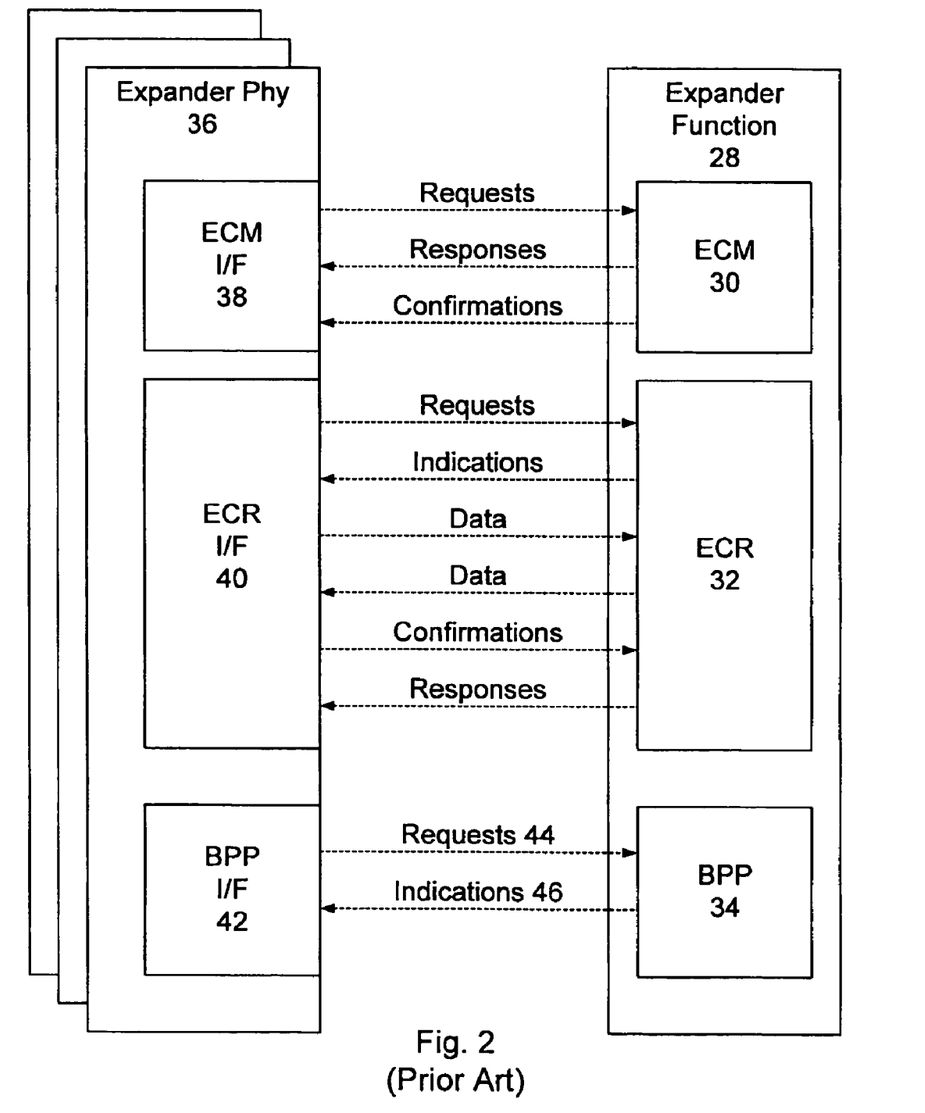
FIG. 2 illustrates known SAS expander functional blocks.

FIG. 2 illustrates expander functions defined by the SAS standard. A typical expander 28 includes an expander connection manager (ECM) 30, an expander connection router (ECR) 32, a BPP 34 and a number of phys. Each phy 36 includes an ECM interface 38, ECR interface 40 and BPP interface 42. Control signals between the elements are indicated by the dotted arrows. Embodiments of the present invention use a subset of the functional blocks and control signals, including the BPP interface 42, the BPP 34, and transmission of BPP Requests 44 and BPP indications 46 between the BPP 34 and BPP interface 42.

Figure 3:
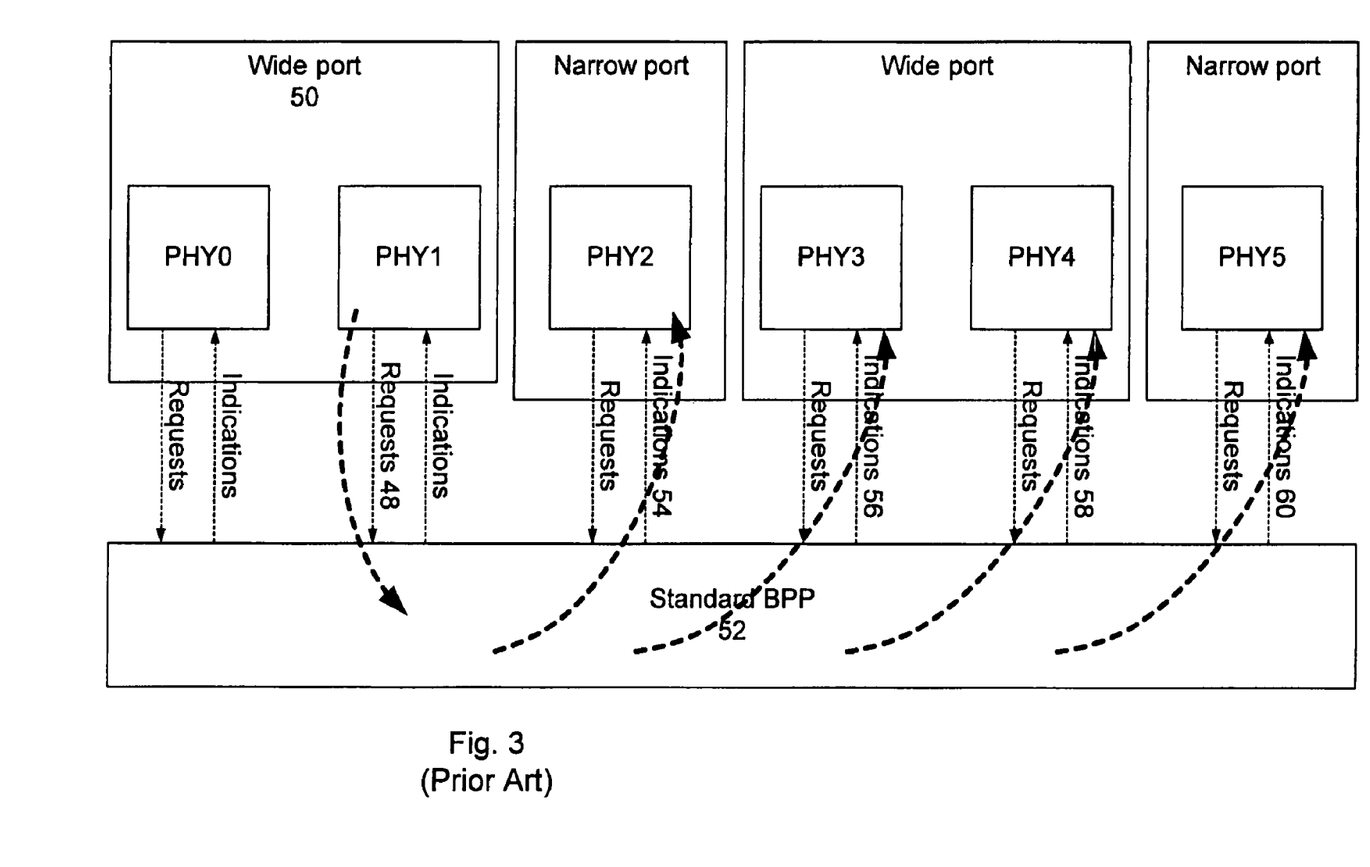
FIG. 3 illustrates known standards-based BPP broadcast processing.

Conventional BPP functionality defined by the SAS standard is illustrated in FIG. 3. Whenever a BPP request is received from a phy, the BPP 52 sends corresponding BPP transmit indications to all phys of the expander except for the phys that belong to the source port. In this example, a broadcast request 48 is received from PHY1, belonging to wide port 50. The BPP 52 sends broadcast transmit indications 54, 56, 58, 60 to PHY2, PHY3, PHY4, and PHY5, since these phys do not belong to the source port 50, but it does not send broadcast transmit indications to PHY0 or PHY1, because they belong to the source port 50.

There are a number of BPP transmit indications and BPP requests defined by the SAS standard. Table 1 lists all the BPP transmit indications and example encoding for different types of BPP transmit indications.

TABLE 1

| BPP_Indication [2:0] | BROADCAST Primitive Transmit Indication |
|---|---|
| b000 | Transmit Broadcast Primitive: BROADCAST (CHANGE) |
| b001 | Transmit Broadcast Primitive: BROADCAST (RESERVED CHANGE 0) |
| b010 | Transmit Broadcast Primitive: BROADCAST (RESERVED CHANGE 1) |
| b011 | Transmit Broadcast Primitive: BROADCAST (SES) |

TABLE 1-continued

| BPP_Indication [2:0] | BROADCAST Primitive Transmit Indication |
|---|---|
| b100 | Transmit Broadcast Primitive: BROADCAST (RESERVED 1) |
| b101 | Transmit Broadcast Primitive: BROADCAST (RESERVED 2) |
| b110 | Transmit Broadcast Primitive: BROADCAST (RESERVED 3) |
| b111 | Transmit Broadcast Primitive: BROADCAST (RESERVED 4) |

Table 2 lists all the BPP request types and example encoding. Embodiments of the present invention are agnostic to the actual encoding of the BPP requests and BPP indication signals, so the encodings in these tables are merely provided as examples.

TABLE 2

| BPP_REQ [3:0] | Description | Source of Request |
|---|---|---|
| b0000 | Broadcast Event Notify (BROADCAST CHANGE received). Request to transmit BROADCAST (CHANGE) on all other ports because the PHY has received a BROADCAST (CHANGE) primitive. | Received |
| b0001 | Broadcast Event Notify (BROADCAST RESERVED CHANGE 0 received). Request to transmit BROADCAST (RESERVED CHANGE 0) on all other ports because the PHY has received a BROADCAST (RESERVED CHANGE 0) primitive. | Received |
| b0010 | Broadcast Event Notify (BROADCAST RESERVED CHANGE 1 received). Request to transmit BROADCAST (RESERVED CHANGE 1) on all other ports because the PHY has received a BROADCAST (RESERVED CHANGE 1) primitive. | Received |
| b0011 | Broadcast Event Notify (BROADCAST SES received). Request to transmit BROADCAST (SES) on all other ports because the PHY has received a BROADCAST (SES) primitive. | Received |
| b0100 | Broadcast Event Notify (BROADCAST RESERVED 1 received). Request to transmit BROADCAST (RESERVED 1) on all other ports because the PHY has received a BROADCAST (RESERVED 1) primitive. | Received |
| b0101 | Broadcast Event Notify (BROADCAST RESERVED 2 received). Notification that a BROADCAST (RESERVED 2) primitive has been detected. | Received |
| b0110 | Broadcast Event Notify (BROADCAST RESERVED 3 received). Notification that a BROADCAST (RESERVED 3) primitive has been detected. | Received |
| b0111 | Broadcast Event Notify (BROADCAST RESERVED 4 received). Notification that a BROADCAST (RESERVED 4) primitive has been detected. | Received |
| b1000 | Broadcast Event Notify (PHY not ready). Request to transmit BROADCAST (CHANGE) on all other ports because the attached PHY lost Dword synchronization (PL_RDY = '0'). | Originated |
| b1001 | Broadcast Event Notify (SATA Spinup Hold). Request to transmit BROADCAST (CHANGE) on all other ports because the PHY has reached the SATA spin-up hold state (as indicated by the PL_SATA_SPINUP_CONF input pin). | Originated |
| b1010 | Broadcast Event Notify (Identification Sequence Complete). Request to transmit BROADCAST (CHANGE) on all other ports because the PHY has | Originated |

TABLE 2-continued

| BPP_REQ [3:0] | Description | Source of Request |
|---|---|---|
| | completed the identification sequence (SL_IR state machine). | |
| b1011 | Broadcast Event Notify (Device Configuration Complete). Request to transmit BROADCAST (CHANGE) on all other ports because the PACK has finished configuring the Device. | Originated |
| b11XX | Reserved | Originated |

Table 2 classifies the BPP requests into two categories based on the source of request: received BPP_REQUEST and originated BPP_REQUEST. If a request is generated by a phy due to receiving a broadcast primitive, this request is considered to be a received BPP Request. If a request is generated by a phy due to other conditions that is detected by the phy internally, such as phy loss of Dword synchronization or phy reaching spin up hold state, then this request is considered to be an originated BPP Request.

In a first exemplary embodiment of the present invention, the conventional SAS physical topology is partitioned into logical zones, or logical regions, for traffic isolation or segregation. The logical zones define virtual domains within which traffic, such as broadcast primitives, flows as per the conventional SAS protocols, but limits traffic across the boundaries of the regions. In other words, devices assigned to one logical zone can access all devices within that logical zone, but only the devices within that logical zone. Depending on the desired application requirements or functionality, logical zones can be fully isolated from other logical zones (i.e. non-overlapping), or can overlap to permit sharing of certain resources, such as target devices, between zones. Embodiments of the present invention provide broadcast handling approaches in SAS logical zones, including: the concept and definition of logical zones, the assignment of membership, and how broadcasts are handled in SAS expander devices. The following commonly-owned, and co-pending applications: U.S. application Ser. No. 11/341,573, filed Jan. 30, 2006 and entitled "Method And Apparatus For Routing In Serial Attached SCSI (SAS) Using Logical Zones", and U.S. Pat. No. 7,496,700 filed Jan. 6, 2006, entitled "Method And Apparatus For STP Flow Control In SAS Expanders" to Chong et al., each of which is incorporated herein by reference in its entirety, provide further details and elaboration concerning defining logical zones and routing messages according to the present invention.

In a second exemplary embodiment, to permit applications even more sophisticated access control among groups of end devices, the end devices are divided into "device groups" with common access control permissions. In this embodiment, the SAS expander devices need to implement access control policies to limit the traffic among the device groups accordingly.

In a technique according to the first embodiment of the present invention, the BPP maintains similar request and indication interfaces with the expander phys as described above, but supports a broadcast isolation function for logical zones. Properly defining such zones for broadcasting SAS primitives can solve the infinite broadcast flooding problem that exists in SAS topologies if a loop is present. The logical zones are defined to be loop-free, and broadcast traffic is contained within the boundaries of the logical zones.

Transparent logical zoning is achieved with enhanced SAS expanders. Subsets of the expander phys are assigned to logical zones based on a desired topology. For non-overlapping logical zoning, each phy belongs to, and can only belong to, one zone. In overlapping logical zoning, each expander phy can be assigned to one or a plurality of logical zones. The physical SAS expander is then partitioned into several logical, or virtual, expanders, each one including the phys assigned to its zone. Each virtual expander includes a SMP target port that is only visible to its assigned phys. All the remaining phys outside the logical zone are not visible to the virtual expander. Each virtual expander implements the full functionality of a standard compliant SAS expander, so it can be used in any SAS domain as if it is a physically separate expander.

Figure 4:
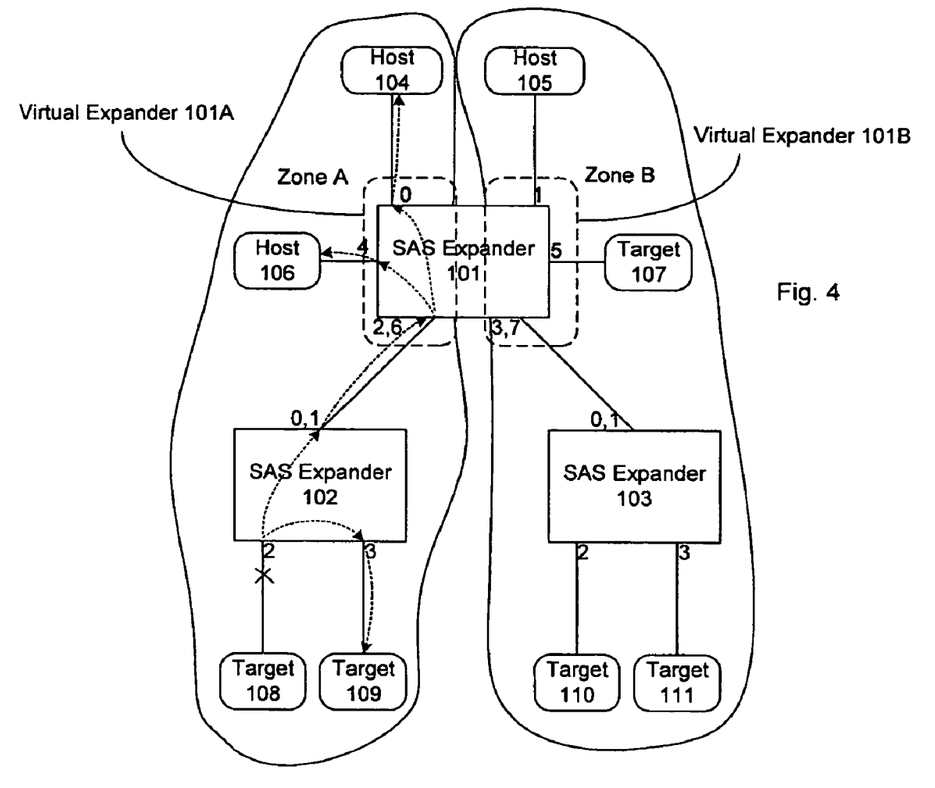
FIG. 4 illustrates broadcast in logical zones according to an embodiment of the present invention.

FIG. 4 shows an example of non-overlapping logical zoning topology according to an embodiment of the present invention. In this example, there are three expanders 101, 102, 103, three host devices 104, 105, 106 and five target devices 107, 108, 109, 110, 111. The physical topology is partitioned into two zones A and B as indicated in FIG. 4. Zone A includes hosts 104, 106, targets 108, 109, expander 102 and that part of expander 101 covering phy 0, phy 4, phy 2, phy 6. Zone B includes host 105, targets 107, 110, 111, expander 103, and that part of expander 101 covering phy 1, phy 5, phy 3, phy 7.

As noted, the expander 101 is divided across two zones. Expander 101 behaves like two isolated logical expanders 101A and 101B as shown by the hashed boxes. Virtual expander 101A includes phy 0, phy 4, phy 2, phy 6 and an internal SMP target port that reports and manages these phys, as well as routing table resources associated with these specific phys. Similarly, logical expander 101B includes phy 1, phy 5, phy 3, phy 7 and an independent SMP target port that is logically independent of the SMP target port of logical expander 101A. As expanders 102 and 103 belong only to one zone each, they can behave like regular expanders that are not aware of the concept of zoning.

FIG. 4 further illustrates the handling of a broadcast event originating from phy 2 of expander 102, as shown by the dotted arrows. Expander 102 forwards the broadcast primitive to all its ports, except for the source port, because all ports belong to the same zone. The broadcast primitive is transmitted by expander 102 to target 109 via phy 3. Another broadcast primitive is transmitted by expander 102 to expander 101 via the wide port defined by phy 0 and phy 1. Expander 101 receives the broadcast event at the wide port defined by phy 2 and phy 6. This port belongs to zone A, and is under the control of virtual expander 101A. The SMP target port of virtual expander 101A determines the appropriate routing for the broadcast event, based on its routing table resources. Since the SMP target port of virtual expander 101A is only aware of phys within its zone, the broadcast primitive is only transmitted to the phys belonging to zone A. Hence, broadcast primitives are transmitted to host 106 via phy 4 and host 104 via phy 0. Although phy 1, phy 5, phy 3, and phy 7 belong to the same physical expander 101, no broadcast primitive is forwarded to them because they belong to a separate zone. Thus, logical zoning can limit the broadcast propagation with the zone boundary, thereby achieving the goal of broadcast traffic isolation.

Figure 5:
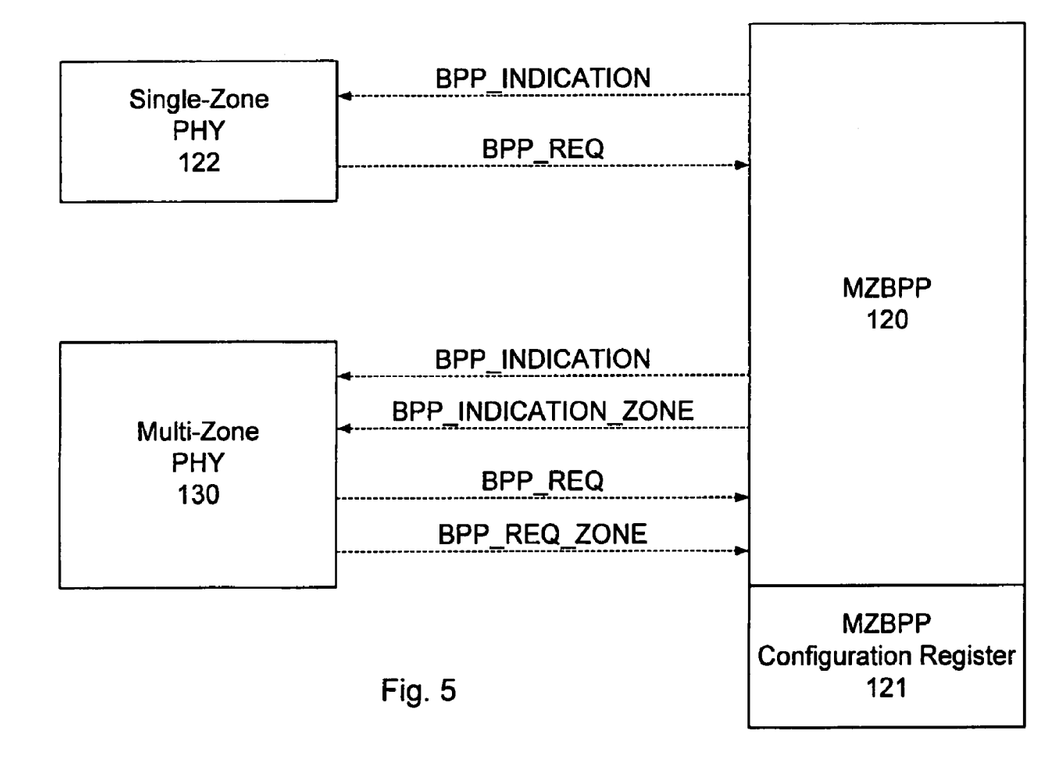
FIG. 5 illustrates multi-zone BPP broadcast interface in logical zones according to an embodiment of the present invention.

To implement primitive broadcasting in logical zones, a multi-zone BPP (MZBPP) 120 that can support both non-overlapping logical zones, and logical zones that overlap, can be provided. FIG. 5 shows an interface used for both types of phys. In the first case, a single-zone expander phy 122 (external or virtual phy) can only belong to one zone. The MZBPP 120 should be aware of the zone membership of each phy. Such information is part of the device configuration that is assigned by the user, and is stored in the MZBPP configuration register 121. The MZBPP configuration register 121 can, for example, contain the data structures such as the group membership per phy, the fabric boundary information per phy, and the access control policy matrix. The zone membership configuration for the single-zone phy can be stored as a configuration parameter and need not be communicated across the BPP interface. Therefore, the interface between single-zone expander phy 122 and the MZBPP 120 only contains BPP_INDICATION and BPP_REQ signals. The MZBPP 120 uses the internal zone membership of the requesting phy as the default BPP_REQ_ZONE information.

In the second case, a multi-zone phy 130 can participate in multiple zones. The BPP requests and BPP indications can carry zone information such as BPP_REQ_ZONE and BPP_INDICATION_ZONE. In such cases, the BPP request can be considered a broadcast frame, including the broadcast primitive. Note that if the application requires a BPP request to be sent to multiple zones, then the BPP_REQ_ZONE and BPP_INDICATION_ZONE can be a bit vector with each bit corresponding to one zone. If the application only requires a BPP request to be sent to one zone, then the BPP_REQ_ZONE and BPP_INDICATION_ZONE can be encoded as a zone index. As described below, BPP_REQ_ZONE is encoded as a bit vector supporting BPP requests targeting multiple zones at the same time. Embodiments of the present invention are applicable for other encoding methods of BPP_REQ_ZONE and BPP_INDICATION_ZONE as well.

Different approaches to encoding of the BPP_INDICATION, BPP_REQ, BPP_REQ_ZONE, BPP_INDICATION_ZONE can be used. The choice of approach does not affect methods according to embodiments of the present invention. Table 1 and Table 2 provide examples of encoding formats for BPP_INDICATION and BPP_REQ.

The configuration information can be represented by a two-dimensional vector: PHY_MEMBER [ZONE_ID] [PHY_ID].

PHY_MEMBER[I] [J] = 1: if phy J is part of Zone I
= 0: if phy J is not part of Zone I The MZBPP 120 can handle broadcast requests according to the following criteria: (1) An expander phy can only request primitive broadcast to any zone of which it is a member. A broadcast request is discarded if the source phy is not part of the requested target zone. (2) A broadcast request is only sent to the phys belonging to the requested logical zones. (3) The BPP indication carries the request zone information such that the target phy has the knowledge about which zone the broadcast has come from. A further criteria is that a broadcast request is not sent to phys that are part of the same wide port as the source phy. However, this criteria is well known in the art and is not specific to the logical zoning aspects of the present invention.

Figure 6:
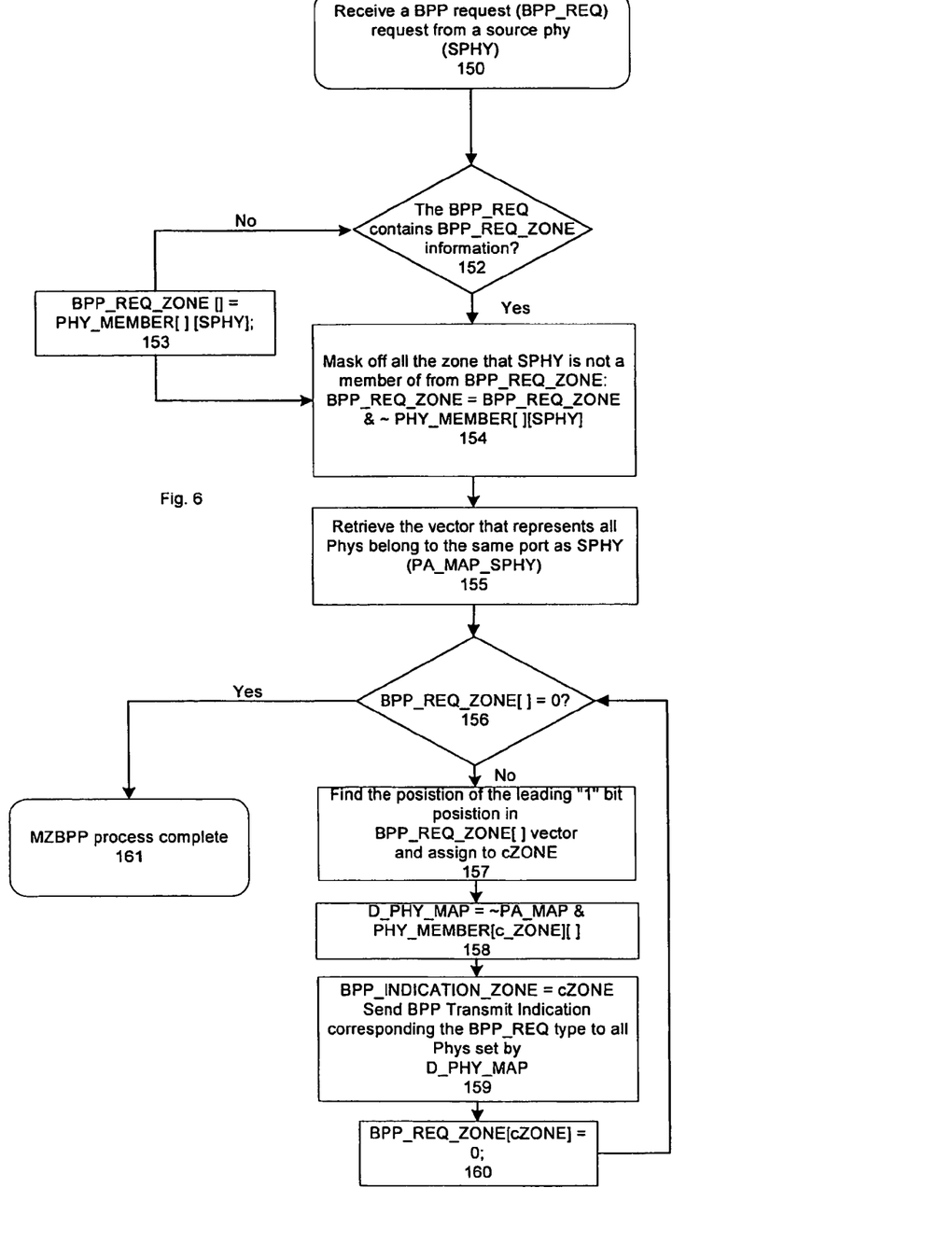
FIG. 6 is a flowchart illustrating a method according to an embodiment of the present invention.

FIG. 6 describes the MZBPP processing steps when handling a broadcast request according to an embodiment of the present invention. The process starts at step 150 in which one or more BPP_REQ requests are received from a source phy (SPHY). Such a request includes BPP_REQ type and optionally the BPP_REQ_ZONE information. Step 152 checks if the request contains zone information. If yes, the process continues to step 154; otherwise, step 153 is taken. In step 153, for a BPP request without target zone information (from a single-zone phy), the default zone information that is the same as the zone membership of the source phy is used as the request zone. In step 154, the MZBPP masks off all the zones that the source phy is not a member of from the BPP_REQ_ZONE vector. This prevents a SPHY from sending a broadcast request to zones of which it is not a member. In step 155 the MZBPP retrieves the PA_MAP_SPHY vector that represents all the phys belonging to the same port as the source phy. Step 156 checks if there is any remaining zone in the BPP_REQ_ZONE vector that has not been serviced. If all requests have been serviced (BPP_REQ_ZONE [ ]=0), then step 161 is taken to complete the MZBPP process. When there is a remaining zone to be serviced, the process continues on to step 157.

At step 157, the MZBPP finds one remaining request zone to be served that corresponds to a non-zero bit in the BPP_REQ_ZONE vector, and assigns it to cZONE. Step 158 calculates the D_PHY_MAP vector that corresponds to all target phys to which the MZBPP intends to forward the broadcast request. The D_PHY_MAP vector is set to correspond to all phys within the current service zone and that are not part of the source port. Step 159 sends the broadcast indication to all phys with D_PHY_MAP bit set to 1. The BPP_INDICATION type is set to a proper value that corresponds to BPP_REQ type, and the BPP_INDICATION_ZONE is set to the value of the current zone ID. Step 160 clears the bit in BPP_REQ_ZONE that correspond to the current zone indicating the current zone broadcast has been processed; it then jumps back to step 156 to check if further broadcasting is required. Steps 156 through 160 are repeated to process each zone within the BPP_REQ_ZONE vector until the broadcast processing has been finished for each requested zone. Step 161 is then taken to complete the MZBPP task of processing a broadcast request.

More sophisticated and flexible control capabilities can be achieved by defining virtual domains on the basis of group membership and group access control privileges. Using a mechanism described herein as "device group access control", an SAS virtual domain topology can be defined that permits controlled access to devices without limiting their membership to a specific zone. Device group access control permits a group of devices to have access to another group of devices, but can be configured to prevent the devices within each logical group from accessing other devices within the same group, or within any other specified group.

Figure 7A:
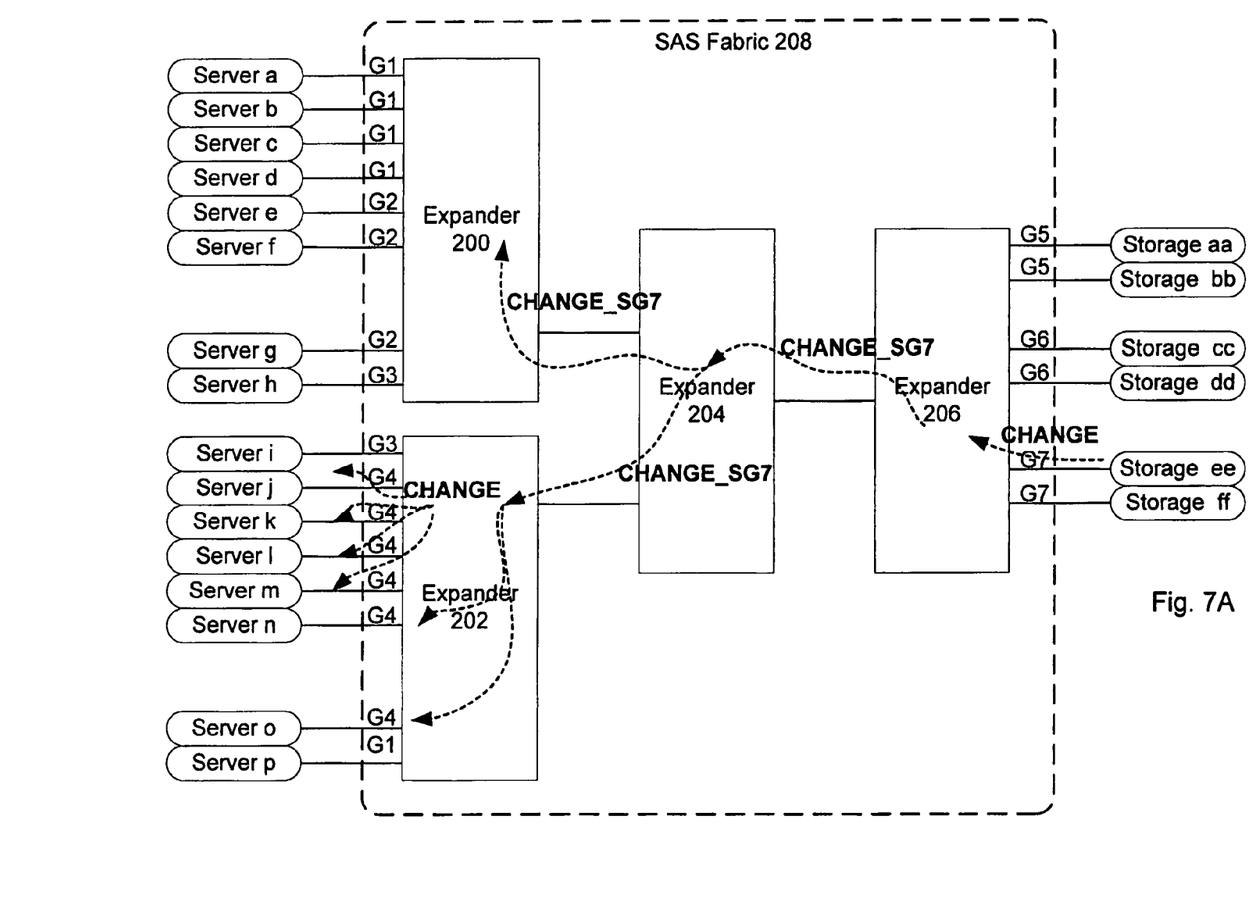
FIG. 7A illustrates broadcast among device groups according to an embodiment of the present invention.
Figure 7B:
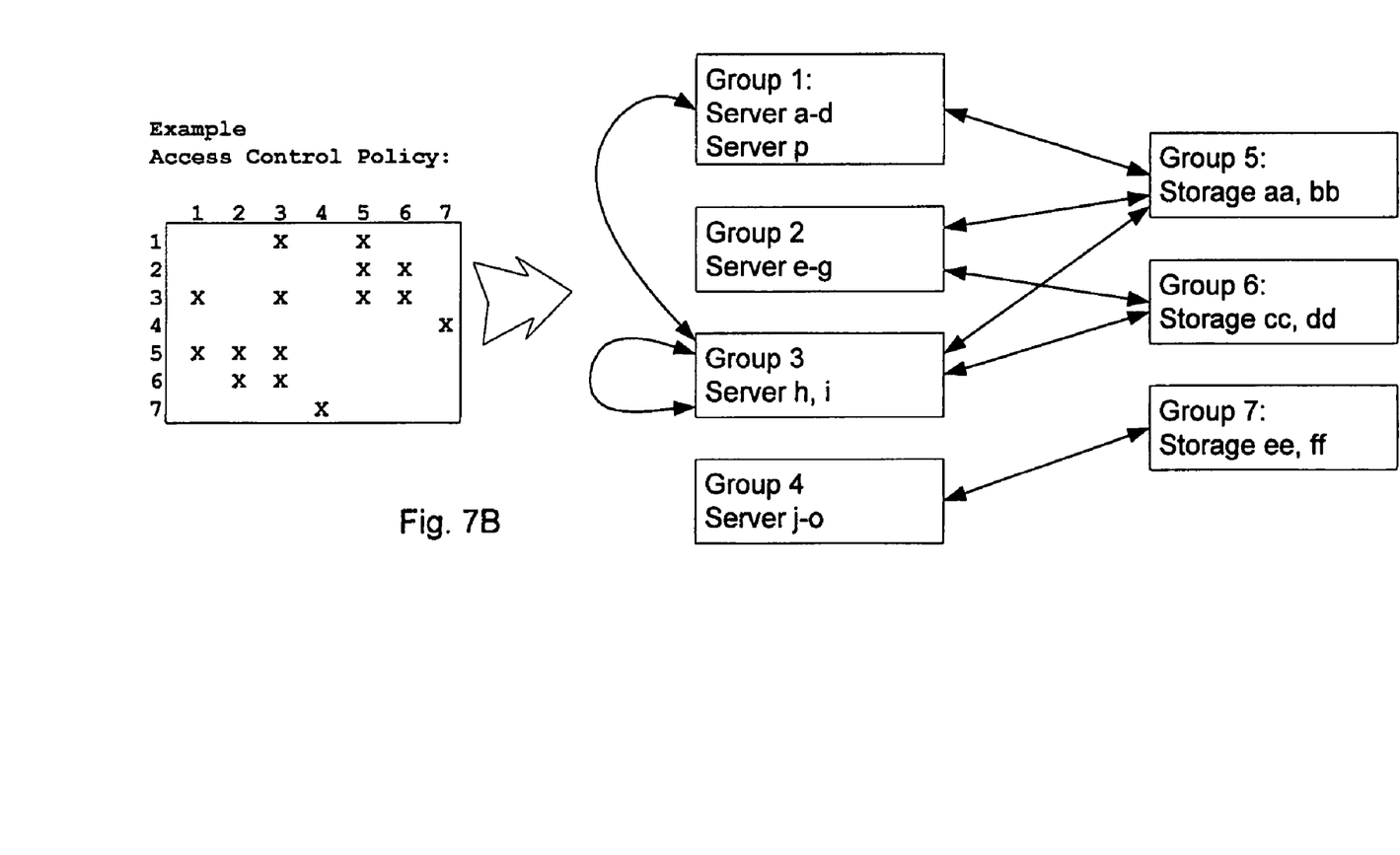
FIG. 7B illustrates an group access control policy matrix according to an embodiment.

FIG. 7A shows an example of device group based broadcast handling according to an embodiment of the present invention. This embodiment uses group aware expanders 200, 202, 204 and 206 to form a SAS switching fabric 208 that implements access control function among devices attached to the fabric. The devices attached to the fabric, including servers a-p and storage devices aa-ff, are divided into device groups with common access control privileges. There are seven groups in this example. The group membership of each attached device is marked with the group ID labels G1 to G7. Referring to FIG. 7B, an access control policy matrix shows a set of example policies, and a graphical view of the access policies with each node representing a group and each arc representing the access permission between two groups. For example, group 4 contains servers j-o, and group 7 contains storage devices ee, ff. An arc between them indicates there is a policy to allow any devices in group 4 to access any device in group 7, but the devices in group 4 cannot access each other, neither can the devices in group 7.

The dotted arrows show an example of broadcast handling among the device groups. For example, as shown, a standard-compliant broadcast CHANGE event is generated from the link attached to storage device ee belonging to group 7. This is a regular standard-compliant broadcast primitive. Expander 206 receives the broadcast request knowing that the source of this broadcast event is from source group 7. Based on the policy matrix, the broadcast is not sent to the phys belonging to groups 5 and 6. Expander 206 sends this broadcast event to expander 204, which can belong to special group 0 for inter-expander connections. To indicate the source group information in the broadcast message, the broadcast CHANGE primitive is replaced by the ingress expander, expander 206, into CHANGE_SG7, a special primitive encoding that carries information about not only the type of broadcast, but also the source group ID. The intermediate expander, expander 204, simply forwards this broadcast primitive to other expanders in the fabric: expanders 200 and 202.

When broadcast primitive CHANGE_SG7 reaches expander 200, it determines, in accordance with the access control policy, that it does not handle messages from source group 7. Thus, the broadcast transmission ceases at expander 200, and the broadcast message is not communicated to any expander phy attached to expander 200. By contrast, when expander 202 receives the CHANGE_SG7 primitive, it forwards the broadcast event to the phys communicating with servers j-o, because these phys belong to group 4, and there is a policy in place that allows group 7 to communicate with group 4. At the egress of the fabric 208, the broadcast CHANGE_SG7 special primitive encoding is replaced by the standard-compliant CHANGE primitive encoding.

For a SAS fabric that supports up to N device groups, an expander in such a fabric with M phys can have, for example, the following configuration information: (1) GID[M]—each phy is assigned a group ID in the range of 0 . . . N−1. (2) ZFLAG[M]—each phy is associated to a fabric boundary flag. 1 indicates the phy is at the edge of the fabric, and 0 indicates the phy is an inter-expander link that is inside the zoning fabric. (3) P[N][N]—an access control policy matrix that defines whether a source group is allowed to access a destination group. P[x][y]=1 indicates any device in group x is allowed to communicate with any device in group y. P[x][y]=0 indicates any device in group x is not allowed to communicate with any device in group y.

To implement primitive broadcasting using device group access control, a device group BPP can handle a broadcast request based on the following criteria: (1) The ingress expander at the fabric boundary replaces the standard broadcast message with a special broadcast primitive that contains not only broadcast type, but also the source group information (SGID) that is the group ID of the source phy. (2) Any zoning aware expander will only forward broadcast messages to destination phys when the SGID in the broadcast request is allowed to talk to the group of the destination phy. (3) The egress expander at the fabric boundary replaces the special broadcast message with SGID encoding with standard broadcast primitive encoding.

Figure 8:
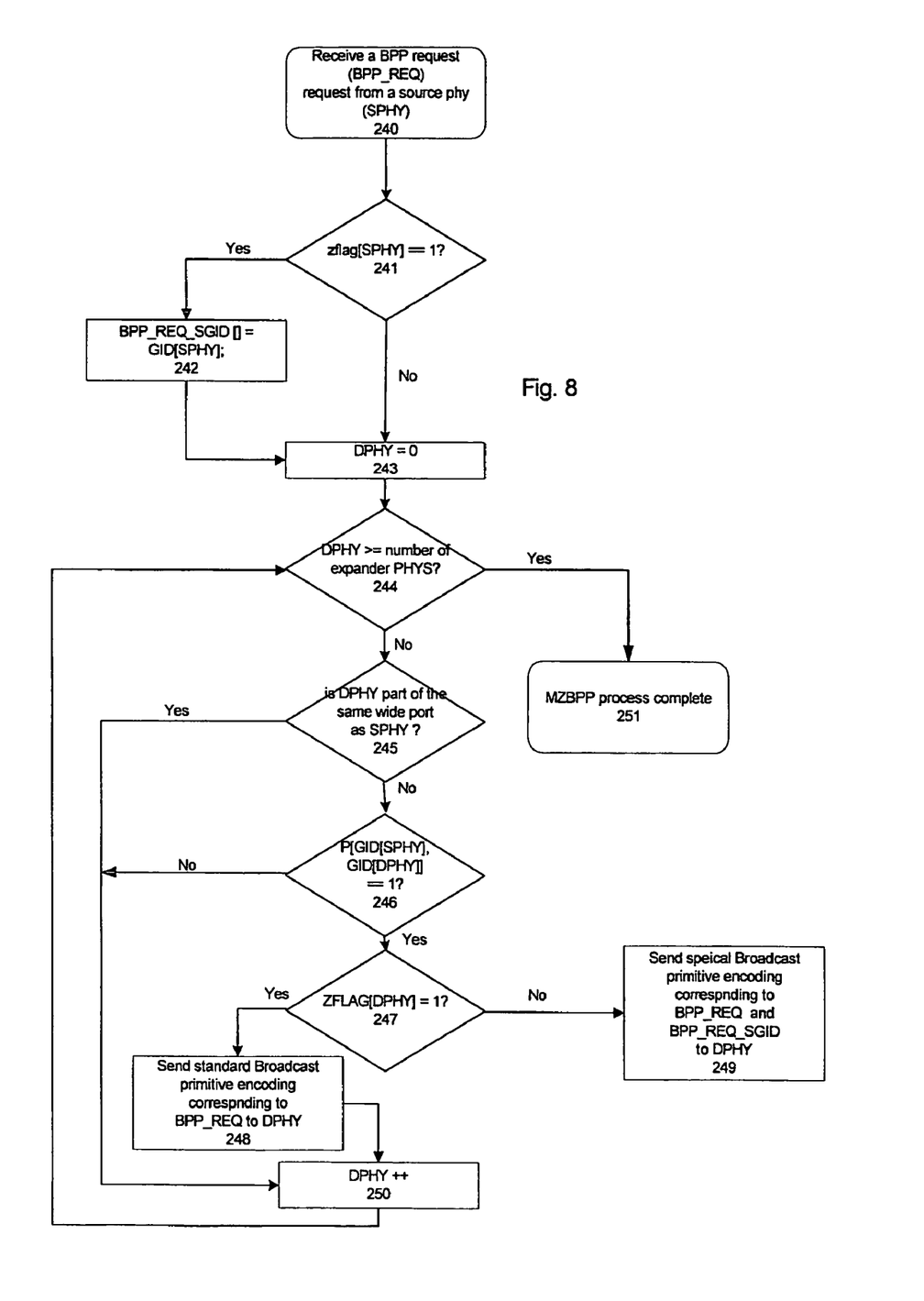
FIG. 8 is a flowchart illustrating a further method according to an embodiment of the present invention.

An algorithm according to an embodiment of the present invention that performs broadcast processing based on the criteria above is illustrated in the flow chart of FIG. 8. At step 240, a BPP_REQ, as described above, is received at a phy. At step 241, if the phy is a source phy, the method proceeds to step 242, where the SGID is added to the BPP_REQ. The method then proceeds to step 243, where the device phy counter DPHY is set to 0. At step 244, DPHY is compared with the number of expander phys. If DPHY is greater than or equal to the number of expander phys, the process completes at step 251. If there are remaining expander phys, the process continues to step 245. At step 245, if DPHY is determined not to indicate a phy that is part of the same wide port as the source phy, SPRY, the process continues to step 246; otherwise, DPHY is incremented at step 250 and the process returns to step 244. At step 246, it is determined if the access control policy matrix for the source phy permits access to the phy DPHY. If not, DPHY is incremented at 250 and the process returns to step 244; if yes, the process continues to step 247. At step 247, it is determined if the phy DPHY is at the edge of the fabric. If it is at the edge, the SGID is stripped from the message and standard encoded BPP_REQ is sent to phy DPHY at step 248. If phy DPHY is not at the edge of the fabric, the special broadcast primitive encoding corresponding to BPP_REQ_SGID is sent to phy DPHY at step 249. In either case, DPHY is then incremented at step 250, and the process returns to step 244.

Embodiments of the present invention can be implemented in Application Specific Standard Integrated Circuit Products (ASSPs). The BPP functionality of the present invention can be implemented in a functional block that incorporates the functionality of the ECM, ECR and BPP functions as state machines. In some implementations, the BPP methods can be implemented in logic gates using ASIC technology. But it should be noted that the same algorithm could be implemented using other means of realization such as using a combination of software and hardware. One possible implementation utilizes programmable logic devices such as FPGAs to implement the disclosed BPP logic. Other implementations include the use of software/firmware running on a microprocessor or a programmable engine to realize the processing flow described by embodiments of the present invention.

In summary, the invention provides a method, or process, for defining virtual domains within a SAS domain topology to permit broadcast event filtering based on policies associated with the virtual domains. The virtual domains can be logical zones where broadcast traffic is limited within the logical zone boundary. The virtual domains can also be defined by device groups having an associated device group access policy managed by expanders within the topology.

Logical zones can be defined based on phys. In one embodiment, each internal or external phy can belong to only one logical zone. In another embodiment, each internal or external phy can belong to multiple logical zones. In a further embodiment, the expander can support a mixture of single-zone phys and multiple-zone phys. Proposed methods of SAS primitive broadcast filtering can support broadcast requests that carry request zone information explicitly or implicitly. In one embodiment, each request can have one target zone only. In another embodiment, each request can have multiple target zones. In a further embodiment, the request does not carry explicit target zone information, but the target zone information is derived from the source phy and the zone membership configuration.

In further embodiments, internal or external phys can belong to specified device groups. An expander can enforce an access control policy based on device groups. An ingress expander can translate broadcast messages at the ingress of a zoning fabric into a special primitive to reflect both broadcast type and device group information. The expander can transmit the specially encoded broadcast primitives into other expanders in the same zoning fabric. The egress expander can translate special broadcast primitive encoding into normal broadcast primitive encoding.

While the described embodiments address the broadcast filtering issue in SAS topology and SAS expander devices, the same concept can be applied to handle port/phy based broadcast filtering in other types of non-SAS communications networks. An important difference in such alternative embodiments involves the fact that the type of broadcast object handled would no longer be considered broadcast primitives, but other types of broadcast packets, frames or signals. The application of embodiments of the present invention in other types of communications networks provides similar benefits to those communications network: high availability and high bandwidth by enabling redundant paths in the network topologies.

Embodiments of the present invention provide viable means to implement redundant paths in any SAS topology. This is very useful in any kind of computing server or storage system that demands high availability. The redundant paths enable server and storage systems to incorporate redundant hot-pluggable modules in the topology to achieve high reliability and high availability. The same SAS topology can be applied to any kind of storage model including Direct Attached Storage (DAS), Network Attached Storage (NAS) or Storage Area Network (SAN) models.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for broadcast primitive filtering, comprising:
   defining, based on expander phy, a first virtual domain and a second virtual domain within a serial attached small computer system interface (SAS) domain topology;
   receiving, at a first serial management protocol (SMP) target port of the first virtual domain, a broadcast primitive from a source physical layer device within the first virtual domain; and
   transmitting the broadcast primitive only to a plurality of physical layer devices in the first virtual domain according to a policy associated with the first virtual domain, the broadcast primitive comprising a four character code sequence, the primitive not containing header, address or payload information, the policy defining whether the source device is allowed to access a destination device, wherein the SMP target port determines a routing for the broadcast primitive, based on routing table resources.

2. The method of claim 1, wherein the source physical layer device is a source phy and the plurality of physical layer devices are phys.

3. The method of claim 2, wherein defining the first virtual domain and the second virtual domain comprises defining a plurality of logical zones within the SAS domain topology.

4. The method of claim 3, wherein transmitting the broadcast primitive includes transmitting the broadcast primitive to the phys associated with a logical zone.

5. The method of claim 4, wherein defining the first virtual domain and the second virtual domain includes associating each phy in the SAS topology to at least one of the logical zones.

6. The method of claim 4, wherein defining the first virtual domain and the second virtual domain includes associating at least one phy to multiple logical zones.

7. The method of claim 6, wherein receiving the broadcast primitive includes receiving zone membership information from the at least one phy.

8. The method of claim 1, wherein receiving the broadcast primitive includes receiving a broadcast primitive processor (BPP) request message.

9. The method of claim 1, wherein transmitting the broadcast primitive includes transmitting a broadcast primitive processor (BPP) transmit indication signal.

10. The method of claim 2, wherein defining the first virtual domain and the second virtual domain comprises associating phys in the SAS topology to device groups defined by group identification information.

11. The method of claim 10, wherein receiving the broadcast primitive includes receiving a broadcast frame including the broadcast primitive and the group identification information associated with the source phy.

12. The method of claim 10, wherein receiving the broadcast primitive includes receiving the broadcast primitive at an ingress expander phy and associating the group identification information associated with the source phy to the broadcast primitive.

13. The method of claim 10, wherein transmitting the broadcast primitive includes transmitting the associated group identification information.

14. The method of claim 12, wherein transmitting the broadcast primitive includes transmitting the broadcast primitive from an egress expander phy after removing the associated group identification information.

15. The method of claim 10, wherein the policy associated with the first virtual domain is a device group access policy.

16. The method of claim 15, wherein the device group access policy includes a policy matrix.

17. The method of claim 15, wherein the policy is configured by a source device or an expander.

18. A serial attached small computer system interface (SAS) expander device, comprising:
    a plurality of ports, each port having at least one phy;
    a plurality of phys, the plurality of phys being a subset of the phys associated with the plurality of ports, the plurality of phys being associated with a serial management protocol (SMP) target port of a virtual domain defined within a SAS topology, the virtual domain being defined based on expander phy; and
    a broadcast primitive processor (BPP) for managing broadcast primitive propagation between the plurality of phys via the SMP target port within the virtual domain according to a policy associated with the virtual domain, the broadcast primitive comprising a four character code sequence, the primitive not containing header, address or payload information, the policy defining whether a source phy is allowed to access a destination phy, wherein the SMP target port determines a routing for the broadcast primitive, based on routing table resources.

19. The SAS expander device of claim 18, wherein the virtual domain is a logical zone defined within the SAS topology, and the BPP function is associated with a virtual expander associated with the logical zone.

20. The SAS expander device of claim 19, wherein the BPP includes means to limit broadcast primitive propagation to the logical zone.

21. The SAS expander device of claim 18, wherein the BPP includes a configuration register for storing zone membership information for a phy.

22. The SAS expander device of claim 18, wherein BPP request and indication messages include zone information associated with a source phy.

23. The SAS expander device of claim 18, wherein the virtual domain is defined based on group membership of phys within the SAS topology, and the BPP function includes means to manage broadcast primitive propagation in accordance with a device group access policy.

24. A serial attached small computer system interface (SAS) topology to permit broadcast primitive filtering, comprising:
    a plurality of host and target devices, each including at least one phy;
    at least one expander for interconnecting the plurality of host and target devices;

a virtual domain defined within the topology; the virtual domain having logically associated therewith a serial management protocol (SMP) target port and a plurality of phys, the plurality of phys being a subset of the phys associated with the plurality of hosts and target devices, the virtual domain being defined based on expander phy; and a broadcast primitive processor (BPP) for managing propagation of a broadcast primitive from any of the host and target devices to the plurality of phys via the SMP target port according to a policy associated with the virtual domain, the broadcast primitive comprising a four character code sequence, the primitive not containing header, address or payload information, the policy defining whether a host device is allowed to access a target device, wherein the SMP target port determines a routing for the broadcast primitive, based on routing table resources.

25. The SAS topology of claim 24, wherein a plurality of virtual domains are defined within the topology.

26. The SAS topology of claim 25, wherein the plurality of virtual domains are a plurality of logical zones comprising separate subsets of phys.

27. The SAS topology of claim 26, wherein the plurality of logical zones are non-overlapping.

28. The SAS topology of claim 26, wherein the plurality of logical zones are overlapping.

29. The SAS topology of claim 26, wherein the BPP restricts propagation of the broadcast primitive to one of the plurality of logical zones.

30. The SAS topology of claim 24, wherein the virtual domain is defined in accordance with group membership of the plurality of host and target devices.

31. The SAS topology of claim 30, wherein the at least one expander forms a switch fabric having ingress and egress ports.

32. The SAS topology of claim 31, wherein the BPP function associates group membership information to the broadcast primitive upon receipt at an ingress port, and removes the group membership information upon transmittal from an egress port.

* * * * *